(12) United States Patent
Tseng

(10) Patent No.: US 7,209,598 B2
(45) Date of Patent: Apr. 24, 2007

(54) IMAGE CORRECTION METHOD

(76) Inventor: Wen-Chao Tseng, No. 56, Minju St., Wufeng Shiang, Taichung (TW) 413

( * ) Notice: Subject to any disclaimer, the term of this patent is extended or adjusted under 35 U.S.C. 154(b) by 827 days.

(21) Appl. No.: 10/368,498

(22) Filed: Feb. 18, 2003

(65) Prior Publication Data
US 2004/0047516 A1 Mar. 11, 2004

(30) Foreign Application Priority Data
Sep. 11, 2002 (TW) .................. 91120807 A

(51) Int. Cl.
G06K 9/40 (2006.01)
H04N 1/40 (2006.01)
G06K 9/38 (2006.01)

(52) U.S. Cl. ........................ 382/274; 358/461
(58) Field of Classification Search ............. 382/141, 382/162, 167, 220, 272, 274; 358/3.21, 401, 358/448, 461, 473, 501, 504, 505
See application file for complete search history.

(56) References Cited
U.S. PATENT DOCUMENTS 5,469,267 A * 11/1995 Wang .................. 358/3.21
6,075,621 A * 6/2000 Takeuchi et al. ............ 358/461
6,674,890 B2 * 1/2004 Maeda et al. ............... 382/149
6,791,720 B1 * 9/2004 Hsieh ......................... 358/473
2001/0055415 A1 * 12/2001 Nozaki ....................... 382/141
2004/0047516 A1 * 3/2004 Tseng ......................... 382/274

* cited by examiner

Primary Examiner—Amir Alavi
(74) Attorney, Agent, or Firm—Berkeley Law & Technology Group, LLP

(57) ABSTRACT

An image correction method is provided. First, scan an all-white document and form a scanned image including a plurality of image pixels with each of them having a gray level value. Next, gather these gray level values statistically such that each of them has an image pixel quantity. Then the maximum gray level value and the minimum gray level value are selected and a middle gray level value is obtained accordingly. Following that, determine whether the reference gray level value is greater or smaller than the middle gray level value according to the document, select the gray level values from within the interval of (the reference gray level value±a gray level value), and weight average the selected gray level values according to these selected gray level values and their corresponding image pixel quantities to obtain a corrected gray level value.

30 Claims, 4 Drawing Sheets

IMAGE CORRECTION METHOD

This application claims the benefit of Taiwan application Serial No. 91120807, filed on Sep. 11, 2002.

BACKGROUND OF THE INVENTION

1. Field of the Invention

The invention relates in general to an image correction method, and more particularly to an image correction method, which, according to the pattern of the document scanned, determines whether the necessary reference gray level value with a maximum image pixel quantity should be greater or smaller than the middle gray level value calculated from the maximum gray level value and the minimum gray level value.

2. Description of the Related Art

Before scanning a document, a scanner normally proceeds with an image correction to avoid an undesirable image distortion of the scanned image. Among the many image correction methods available nowadays, the image correction method disclosed in Taiwan Patent Publication Serial No. 376648 will be used as an example for explanation in assistance with FIG. 1.

Please refer to FIG. 1. First of all, an all-white document is scanned and a scanned image is formed in procedure 102, wherein the scanned image includes a plurality of image pixels with each of them having a gray level value. Next, proceed to procedure 104 where these gray level values are ranked with each of them having an image pixel quantity, wherein a profile of gray level values, as shown in FIG. 2, is formed according to these gray level values and their corresponding image pixel quantities.

Referring to FIG. 2, the horizontal ordinate represents the gray level value whereas the vertical ordinate represents the image pixel quantity. When the reference basis measures 8 bits, the gray level value on the horizontal ordinate will have a distribution ranging from 0 to 255. A gray level value getting close to 255 implies that the image pixel is too white; on the contrary, a gray level value getting close to 0 implies that the image pixel is too black.

Ideally, when an all-white document is scanned, the profile of the gray level values should show a tendency towards white, i.e., the gray level value of the image pixel is near 255. In reality, due to the dusts alighting on the all-white document, a profile of gray level values whose distribution curve shows a peak at each of the two ends and a valley in the middle is resulted as shown in FIG. 2. Of which, the image pixels inside the right-end wave peak have higher gray level values showing a tendency towards white and a larger image pixel quantity, while the image pixels inside the left-end wave peak have lower gray level values showing a tendency towards black and a smaller image pixel quantity.

Next, proceed to procedure 106 where a median gray level value ME is taken from the profile of gray level values as shown in FIG. 2 and a standard error of the distribution S is calculated. Of which, the median value of gray level ME is close to the right-end wave peak because it occupies a larger portion of image pixels. Following that, proceed to procedure 108 where gray level values are selected from within the interval of (ME±ηS) wherein η ranges from 2 to 3.3. All of these gray level values selected from within the interval are weight averaged to obtain a corrected gray level value. This method ends here.

However, if blemishes on the all-white document are numerous or the scanner is interfered with by external noises during scanning, the gray level values obtained and their corresponding image pixel quantities might result in a profile as shown in FIG. 3. The image pixel quantity inside the right-end wave peak of FIG. 3 is smaller than that of FIG. 2, whereas the image pixel quantity inside the left-end wave peak of FIG. 3 is much larger than that of FIG. 2. If the median gray level value ME is taken from the profile of gray level values as shown in FIG. 3 and the standard error of the distribution S is calculated, the median gray level value ME will be closer to the left-end wave peak because it occupies a larger portion of image pixels. Furthermore, the corrected gray level value obtained by weight averaging the gray level values selected from the interval of (ME±ηS) would have enormous differences with expected results. Of which η ranges from 2 to 3.3. Therefore the abovementioned method cannot be applied to such a special condition.

SUMMARY OF THE INVENTION

It is therefore an object of the invention to provide an image correction method, which filters the many blemishes on an all-white document, white spots on an all-black document and the occurrence of interference due to external noises during scanning, and excludes these special conditions from being included in the correction range assuring an appropriate image correction. According to the design of this method, whether the necessary reference value of gray levels with maximum pixels is greater or smaller than the middle value of gray levels calculated from the maximum value and the minimum value of gray levels is determined according to the patterns of the document scanned.

An image correction method is provided according to the object of the invention. First, scan an all-white document and form a scanned image including a plurality of image pixels with each of them having a gray level value. Next, gather these gray level values statistically such that each of them has an image pixel quantity. Then the maximum gray level value and the minimum gray level value are selected and a middle gray level value is obtained accordingly. Following that, determine whether the reference gray level value is greater or smaller than the middle gray level value according to the document, select the gray level values from within the interval of (the reference gray level value±a gray level value), and weight average all of these selected gray level values according to these selected gray level values and their corresponding image pixel quantities to obtain a corrected gray level value. Otherwise, method ends.

An image correction method is provided according to the object of the invention. First, scan the document and focus the light on a number of sensitive pixels of a sensitive element to form a scanned image, wherein the scanned image includes a number of image pixels with each of them having a gray level value. Next, these gray level values corresponding to each sensitive pixel are gathered statistically so that each gray level value has an image pixel quantity. A profile of gray level values is formed according to the gray level values and their corresponding image pixel quantities. Then select the maximum gray level value and the minimum gray level value to obtain a middle gray level value. Following that, determine whether the reference gray level value is greater or smaller than the middle gray level value according to the document, select the gray level values from within the interval of (the reference gray level value±a gray level value), and weight average all of these selected gray level values according to these selected gray level values and their corresponding image pixel quantities to obtain a corrected gray level value. Otherwise, this method ends.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
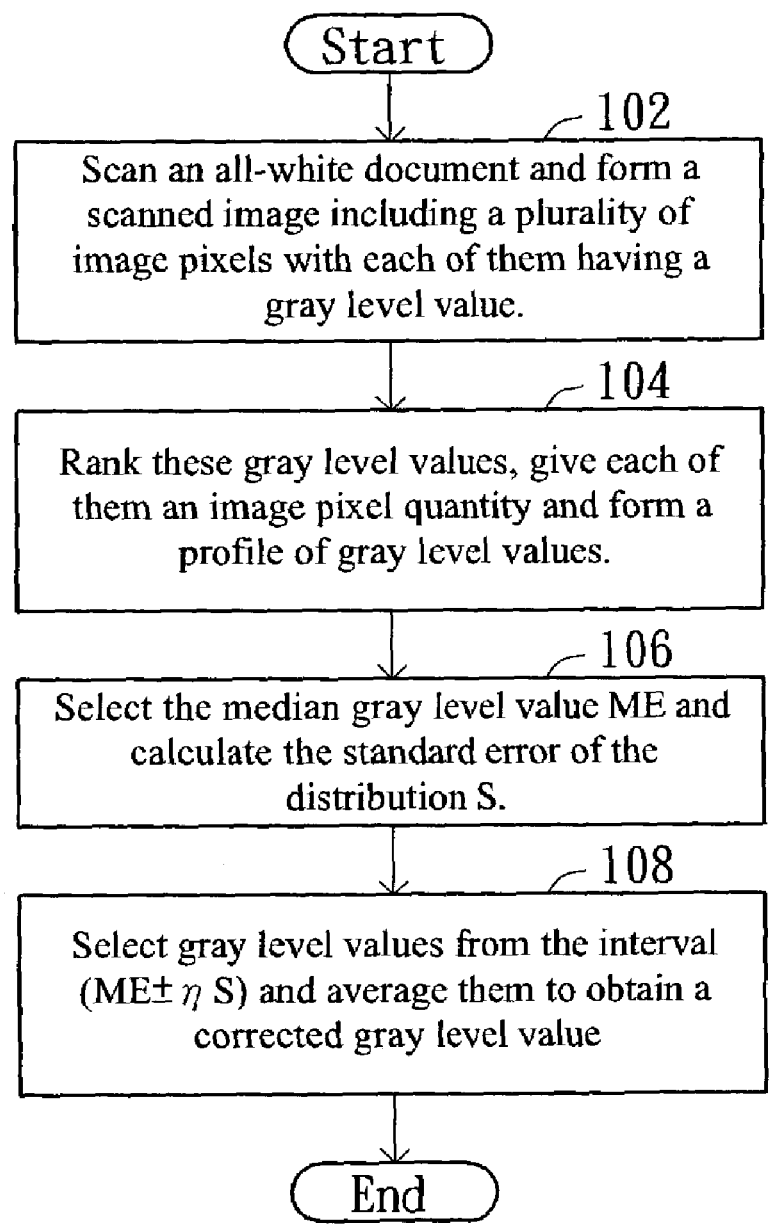
FIG. 1 shows a flow chart according to the image correction method disclosed in Taiwan Patent Publication Serials No. 376648.
Figure 2:
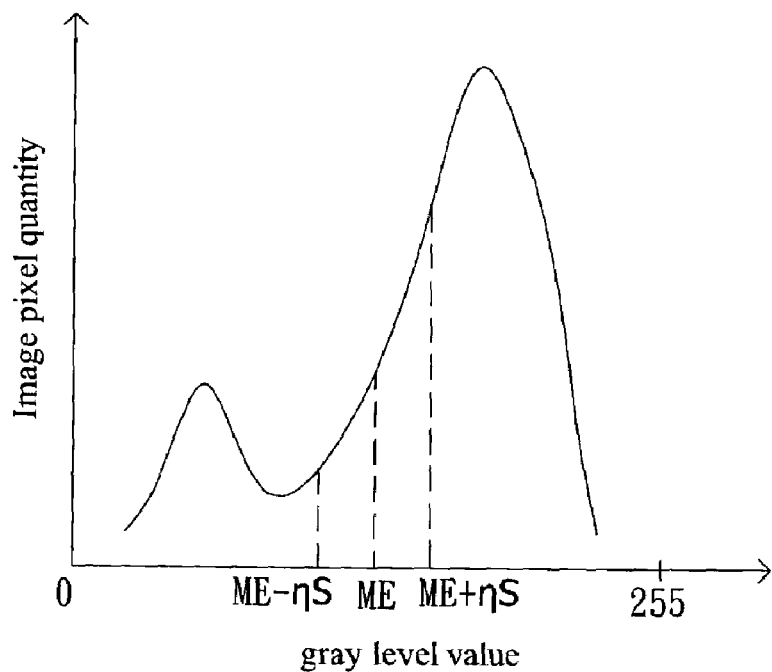
FIG. 2 shows a profile of gray level values with a median gray level value for a scanned all-white document.
Figure 3:
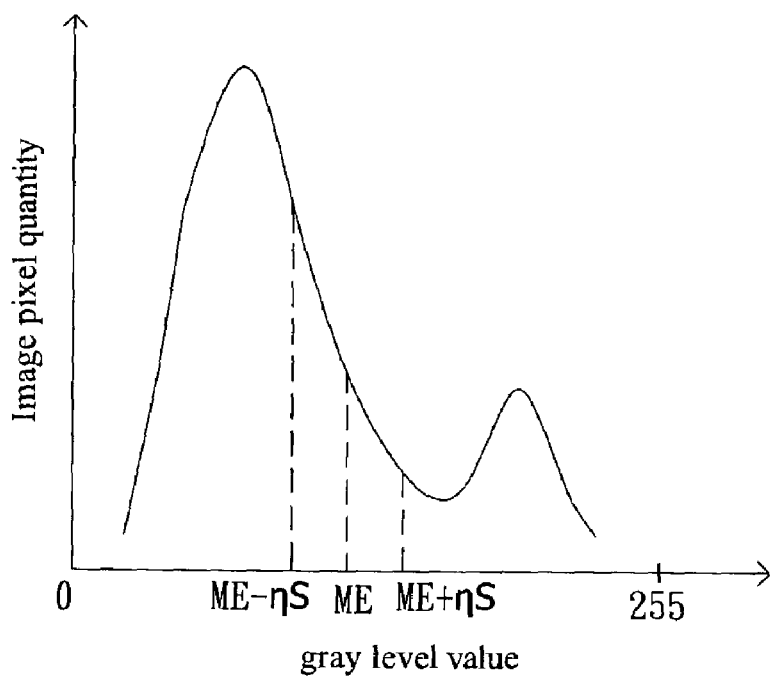
FIG. 3 shows a profile of gray level values with a median gray level value for a scanned all-white document with plenty of blemishes or having been interfered with by external noises during scanning.
Figure 4:
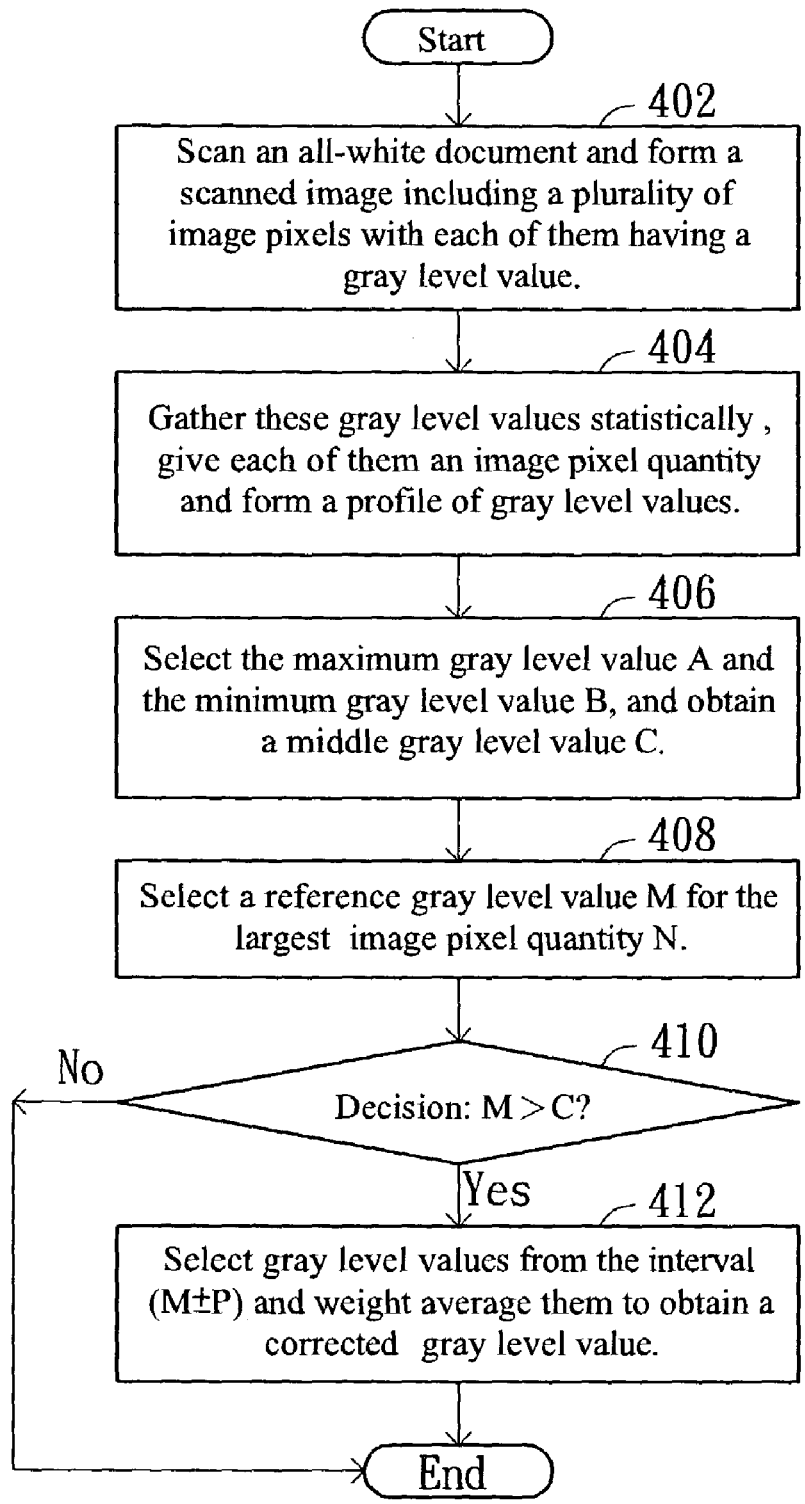
FIG. 4 shows a flow chart of an image correction method according to a preferred embodiment of the invention.

Please refer to FIG. 4, a flow chart of an image correction method according to a preferred embodiment of the invention. First, start with procedure 402 where an all-white document is scanned and a scanned image is formed by focusing the light on the sensitive pixels of a sensitive element. Of which, the scanned image includes a plurality of image pixels with each of them having a gray level value. Next, proceed to procedure 404 where the grave level values gathered statistically to generate an image pixel quantity corresponding to each gray level value. Of which, a profile of gray level values corresponding to each sensitive pixel as shown in FIG. 5 is formed according to the gray level values and their corresponding image pixel quantities.

Figure 5:
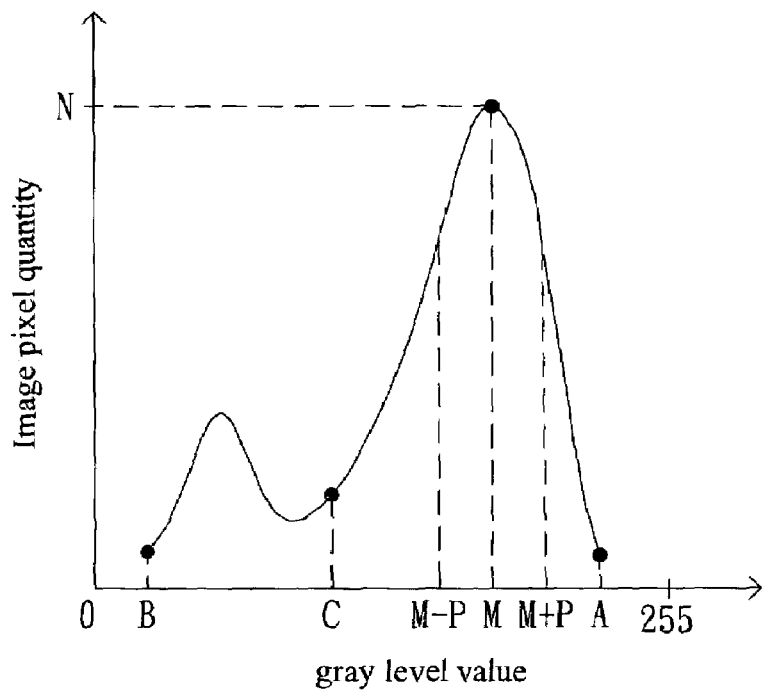
FIG. 5 shows a profile of gray level values with a middle gray level value for a scanned all-white document.

In FIG. 5, the horizontal ordinate represents the gray level value whereas the vertical ordinate represents the image pixel quantity. When reference basis measures 8 bits, the gray level value on the horizontal ordinate will have a distribution ranging from 0 to 255. A gray level value getting close to 255 implies that the image pixel is too white; on the contrary, a gray level value getting close to 0 implies that the image pixel is too black.

Following that, proceed to procedure 406. Select a maximum gray level value A and a minimum gray level value B from the profile of gray level values corresponding to the sensitive pixels to obtain a middle gray level value C accordingly. Of which, C can be equal to a half of the difference by subtracting the minimum gray level value B from the maximum gray level value A, i.e., $C=(A-B)/2$; or C can be equal to a half of the sum of the maximum gray level value A and the minimum gray level value B, i.e., $C=(A+B)/2$. Furthermore, the middle gray level value C must be situated around the valley between the two wave peaks of FIG. 5. This invention will use the middle gray level value C as a reference basis. After that, proceed to procedure 408 where the reference gray level value M for the largest image pixel quantity is selected from the profile of gray level values corresponding to the sensitive pixels. Of which, the reference gray level value M must be located on the right-end wave peak of FIG. 5.

Figure 6:
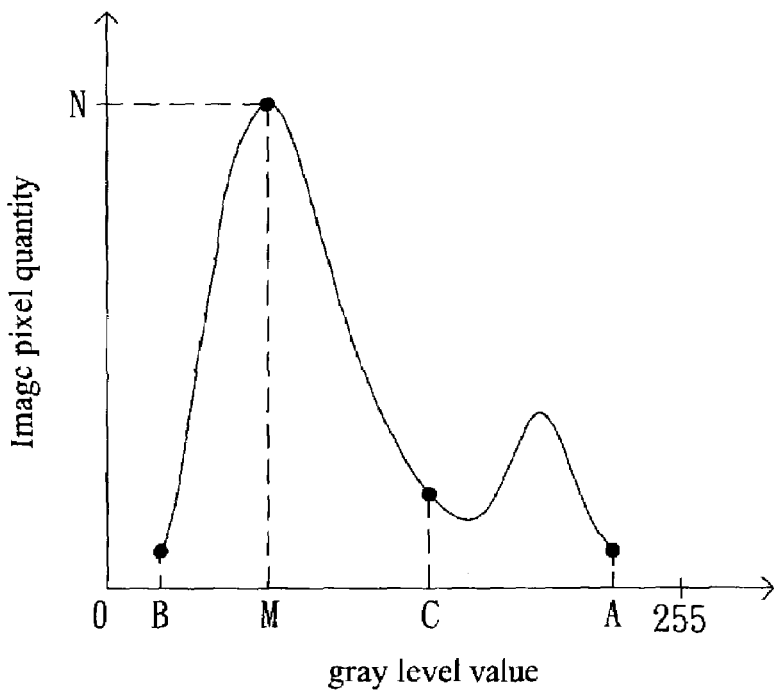
FIG. 6 shows a profile of gray level values with a middle gray level value for a scanned all-white document with plenty of blemishes or having been interfered with by external noises during scanning.

Proceed to procedure 410. Determine if the reference gray level value M is greater than the middle gray level value C or not. If yes, proceed to the next procedure; otherwise, end this method. Since the scanned document is all-white, the reference gray level value M obtained in the invention must be greater than the middle gray level value C to accord with expectations before proceeding to the next procedure. In other words, a result with the reference gray level value M obtained in the invention being smaller than the middle gray level value C, as shown in FIG. 6, is out of expectation, and this leads to an end of this method.

Such a decision module, which can filter special conditions such as too many blemishes being alighted on an all-white document and the occurrence of interference due to external noises during scanning, excludes these biases which have enormous differences with expected results from the correction range. An appropriate image correction can thus be obtained.

At last, proceed to procedure 412. Select all the gray level values from within the interval of (reference gray level value M±a gray level value P) and weight average all of these selected gray level values according to these selected gray level values and their corresponding image pixel quantities to obtain a corrected gray level value. End this method. The gray level value P can be set with flexibility. For example, P can be set to be one tenth of the reference gray level value M.

It is noteworthy that anyone who is familiar the technology of the invention can make necessary adjustments to achieve a similar function without violating the spirit of the invention. For example, when an all-black document is scanned, the image correction method according to the invention can be adjusted as follows:

First, scan an all-black document and form a scanned image including a plurality of image, pixels with each of them having a gray level value. Next, these gray level values are gathered statistically to generate an image pixel quantity of each gray level value, then the maximum and the minimum gray level values are selected, and a middle gray level value is obtained accordingly. Following that, the reference gray level value for the largest image pixel quantity is selected and compared to the middle gray level value. If the reference gray level value is smaller than the middle gray level value, then select gray level values from within the interval of (reference gray level value±gray level value), and weight average all of these selected gray level values according to these selected gray level value and their corresponding image pixel quantities to obtain a corrected gray level value. Otherwise, this method ends. Of which, the middle gray level value can be equal to a half of the difference by subtracting the minimum gray level value from the maximum gray level value, or can be equal to a half of the sum of the maximum gray level value and the minimum gray level value.

Such a decision module filters special conditions such as having too many blemishes on an all-white document or the occurrence of interference due to external noises during scanning and excludes these biases which have enormous differences with expected results from the correction range. An appropriate image correction can thus be obtained.

An image correction method is disclosed in the above preferred embodiment. According to the design of this method, whether the reference gray level value is greater than or smaller than the middle gray level value determined according to the patterns of the document scanned. Special conditions such as too many blemishes on an all-white document, white spots on an all-black document and the occurrence of interference due to external noises during scanning are filtered out and are excluded from the correction range by means of this design. An appropriate image correction can thus be obtained.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image correction method, comprising:
   scanning a document to generate a scanned image including a plurality of image pixels associated with one or more gray level values;
   gathering the gray level values statistically and associating said one or more gray level values with an image pixel quantity;
   obtaining a middle gray level value;
   selecting a reference gray level value with a largest image pixel quantity; and
   selecting the gray level values from within an interval of the reference gray level value ± and a gray level value, and weight averaging the selected gray level values according to the selected gray level values and their corresponding image pixel quantities to obtain a corrected gray level value.

2. The correction method according to claim 1, wherein the method comprises the step of determining whether the reference gray level value is greater than the middle gray level value in response to the document being all-white.

3. The correction method according to claim 1, wherein the method comprises the step of determining whether the reference gray level value is smaller than the middle gray level value in response to the document being all-black.

4. The correction method according to claim 1, further comprising:
   forming a profile of the gray level values according to the gray level values and associated image pixel quantities, wherein a horizontal ordinate of the profile represents the gray level value and wherein a vertical ordinate of the profile represents the image pixel quantity.

5. The correction method according to claim 1, wherein the gray level value is substantially one tenth of the reference gray level value.

6. The correction method according to claim 1, wherein the middle gray level value substantially equals a half of the sum of a maximum gray level value and a minimum gray level value.

7. The correction method according to claim 1, the middle gray level value substantially equals half of the difference of a minimum gray level value and a maximum gray level value.

8. An image correction method, comprising:
   scanning a document to form a scanned image, wherein the scanned image includes a plurality of image pixels associated with gray level values;
   gathering the gray level values associated with said pixels, associating one or more of said gray level values with image pixel quantities, and forming a profile of the gray level values according to the gray level values and associated with said image pixel quantities;
   obtaining a middle gray level value;
   selecting a reference gray level value with a largest image pixel quantity;
   determining whether the reference gray level value is greater or smaller than the middle gray level value according to the document; and
   selecting the gray level values from within an interval of the reference gray level value ± and a gray level value, and weight averaging the selected gray level value according to the selected gray level values and their corresponding image pixel quantities to obtain a corrected gray level value.

9. The correction method according to claim 8, wherein the method comprises the step of determining whether the reference gray level value is greater than the middle gray level value in response the document being all-white.

10. The correction method according to claim 8, wherein the method comprises the step of determining whether the reference gray level value is smaller than the middle gray level value in response the document being all-black.

11. The correction method according to claim 8, wherein the gray level value is substantially one tenth of the reference gray level value.

12. The correction method according to claim 8, wherein the middle gray level value substantially equals one half of the sum of a maximum gray level value and a minimum gray level value.

13. The correction method according to claim 8, wherein the middle gray level value substantially equals one half of a difference a minimum gray level value and a maximum gray level value.

14. A scanner applying an image correction method, wherein the method comprises:
   scanning a document to generate a scanned image including a plurality of image pixels associated with one or more gray level values;
   gathering the gray level values statistically and associating said one or more gray level values with an image pixel quantity;
   obtaining a middle gray level value;
   selecting a reference gray level value with a largest image pixel quantity; and
   selecting the gray level values from within an interval of the reference gray level value ± and a gray level value, and weight averaging the selected gray level values according to the selected gray level values and their corresponding image pixel quantities to obtain a corrected gray level value.

15. The scanner according to claim 14, wherein the method comprises the step of determining whether the reference gray level value is greater than the middle gray level value in response to the document being all-white.

16. The scanner according to claim 14, wherein the method comprises the step of determining whether the reference gray level value is smaller than the middle gray level value in response to the document being all-black.

17. The scanner according to claim 14, further comprising:
   forming a profile of the gray level values according to the gray level values and associated image pixel quantities, wherein a horizontal ordinate of the profile represents the gray level value and wherein a vertical ordinate of the profile represents the image pixel quantity.

18. The scanner according to claim 14, wherein the gray level value is substantially one tenth of the reference gray level value.

19. The scanner according to claim 14, wherein the middle gray level value substantially equals a half of the sum of a maximum gray level value and a minimum gray level value.

20. The scanner according to claim 14, wherein the middle gray level value substantially equals half of the difference of a minimum gray level value and a maximum gray level value.

21. An image correction method, comprising:
selecting a reference gray level value for a gray level value associated with one or more image pixels of an image, wherein the reference gray level value is associated with a largest image pixel quantity; and
selecting one or more gray level values from within an interval centered about the reference gray level value and based, at least in part, on a gray level value; and
weight averaging the selected gray level values according to the selected gray level values and associated image pixel quantities to obtain a corrected gray level value.

22. The method of claim 21 further comprising:
selecting a maximum gray level and a minimum gray level value to obtain a middle gray level value.

23. The method of claim 21 further comprising:
selecting a maximum gray level and a minimum gray level value to obtain a middle gray level value; and
determining whether the reference gray level value is smaller than the middle gray level value.

24. The method of claim 22 further comprising:
determining whether the reference gray level value is greater than the middle gray level value when the image is all-white.

25. The method of claim 23 further comprising:
determining whether the reference gray level value is smaller than the middle gray level value in response to the image being all-black.

26. The method of claim 21 further comprising statistically gathering gray level values of an image to determine the largest image pixel quantity.

27. An apparatus comprising:
means for selecting a reference gray level value for a gray level value associated with one or more image pixels of an image, wherein the reference gray level value is associated with a largest image pixel quantity;
means for selecting one or more gray level values from within an interval centered about the reference gray level value and based, at least in part, on a gray level value; and
means for weight averaging the selected gray level values according to the selected gray level values and associated image pixel quantities to obtain a corrected gray level value;
means for selecting one or more gray level values from within an interval of the reference gray level value ± a gray level value, and weight averaging the selected gray level values according to the selected gray level values and their corresponding image pixel quantities to obtain a corrected gray level value.

28. The apparatus of claim 26 further comprising:
means for selecting a maximum gray level and a minimum gray level value to obtain a middle gray level value; and
means for determining whether the reference gray level value is greater than the middle gray level value.

29. The apparatus of claim 26 further comprising:
means for selecting a maximum gray level and a minimum gray level value to obtain a middle gray level value.

30. The apparatus of claim 27 further comprising:
means for statistically gathering gray level values of an image to determine the largest image pixel quantity.

* * * * *

UNITED STATES PATENT AND TRADEMARK OFFICE
CERTIFICATE OF CORRECTION

PATENT NO. : 7,209,598 B2
APPLICATION NO. : 10/368498
DATED : April 24, 2007
INVENTOR(S) : Tseng Wen-Chao It is certified that error appears in the above-identified patent and that said Letters Patent is hereby corrected as shown below:

Claim 9, fourth line should read "level value in response to the document being all-white."

Claim 10, fourth line should read "level value in response to the document being all-black."

Claim 13, third line should read "a difference of a minimum gray level value and a maximum."

Claim 28, first line should read "The apparatus of claim 27 [[26]] further comprising:"

Claim 29, first line should read "The apparatus of claim 27 [[26]] further comprising:"

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,209,598 B2                                                Page 1 of 1
APPLICATION NO.    : 10/368498
DATED              : April 24, 2007
INVENTOR(S)        : Tseng Wen-Chao It is certified that error appears in the above-identified patent and that said Letters Patent is hereby corrected as shown below:

Column 6, Claim 9, line 19, should read "level value in response <u>to</u> the document being all-white."

Column 6, Claim 10, line 23, should read "level value in response <u>to</u> the document being all-black."

Column 6, Claim 13, line 33, should read "a difference <u>of</u> a minimum gray level value and a maximum."

Column 8, Claim 28, line 24, should read "The apparatus of claim <u>27</u> [[26]] further comprising:"

Column 8, Claim 29, line 30, should read "The apparatus of claim <u>27</u> [[26]] further comprising:"

This certificate supersedes the Certificate of Correction issued June 30, 2009.

Signed and Sealed this

Twenty-eighth Day of July, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,209,598 B2                                           Page 1 of 1
APPLICATION NO.    : 10/368498
DATED              : April 24, 2007
INVENTOR(S)        : Tseng It is certified that error appears in the above-identified patent and that said Letters Patent is hereby corrected as shown below:

On the title page item (57),
In the abstract, line 10, please replace "value±a" with --value ± a--.
At column 6, line 11, please replace "value" with --values--.

Signed and Sealed this

Twentieth Day of April, 2010

David J. Kappos
*Director of the United States Patent and Trademark Office*